Patented Nov. 11, 1952

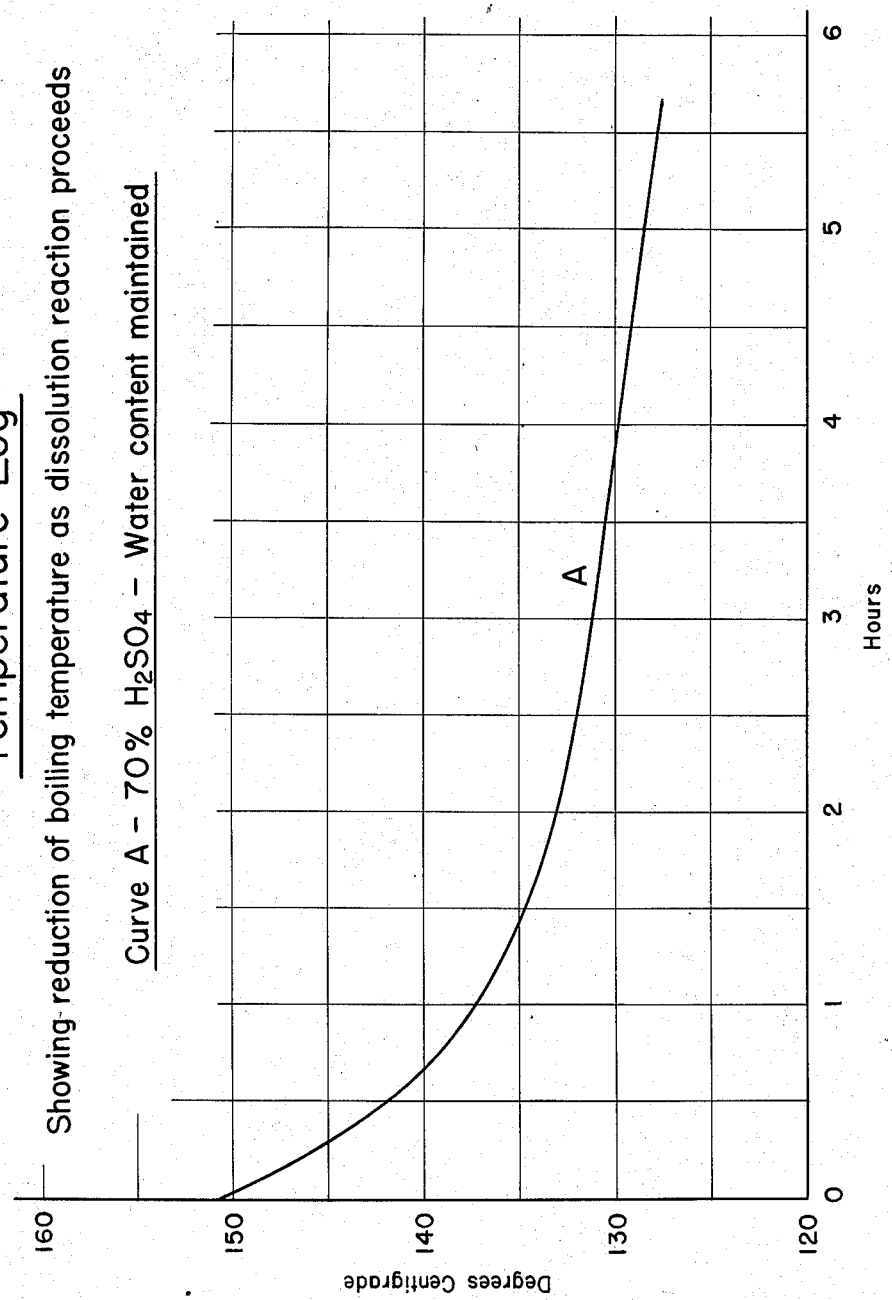

2,617,724

UNITED STATES PATENT OFFICE 2,617,724

PROCESS FOR DISSOLUTION OF
TITANIFEROUS MATERIALS

Helmut Espenschied, Metuchen, N. J., assignor to
National Lead Company, New York, N. Y., a
corporation of New Jersey Application October 4, 1947, Serial No. 777,899

4 Claims. (Cl. 75—115)

This invention relates to an improved process for the dissolution of titaniferous materials. More particularly it relates to a liquid phase dissolution of titanium ores, such as ilmenite in sulfuric acid.

One of the primary objectives of investigators working with titanium ores is to devise a practical, economical method for obtaining a solution which contains a high recovery of the titanium values from the ore without at the same time containing excessive amounts of acid.

Many proposed methods are described in the prior art for digesting titanium ores in sulfuric acid. They vary in substance from fusing with $NaHSO_4$ to formation of metalloids for catalytic dissolution processes. The vast majority of the dissolution procedures, however, are accomplished by the reaction of strong sulfuric acid with ground ore at a sufficiently high temperature to "dry out" and "cure" the digestion cake. The "cured" cake is then dissolved in weak acid or water, usually in the presence of a reducing material, such as scrap iron, to produce a titanium solution. By the use of this method, which involves the formation of a solid cake, relatively long periods of time, such as 24 hours for example, are consumed in dissolving the digestion cake.

A method, the so-called fluid process, has also been proposed which eliminates this solid phase step by dissolving the ore directly with sulfuric acid. According to this process approximately 80 per cent $H_2SO_4$ is added to the ore and the mixture agitated and heated to boiling. As the reaction proceeds, the mass tends to thicken and is therefore diluted at intervals by addition of water or dilute acid to prevent the mass from turning to the solid state.

According to this process, however, certain definite limitations and handicaps are encountered which cannot be eliminated. By the use of strong acid and before subsequent dilution of the solution, the boiling point of the mixture which contains the strong acid reaches relatively high temperatures. At first glance, these high temperatures appear to be advantageous in that they accelerate the reaction of the ore with the acid, but it has been found that titanyl sulfate and ferrous sulfate mono-hydrate tend to precipitate from solution at these relatively high temperatures. In order to avoid or minimize the crystallization of these and other similar compounds and to maintain the digestion slurry in a liquid state, water or weak acid is added in increments at the appearance of thickening.

The carefully controlled additions of water or weak acid creates a difficult problem in commercial operation. The ever-changing viscosity of the slurry must be controlled throughout the entire reaction by visual observation or by employing intricate mechanical devices for measuring the viscosity of the solution. Furthermore, each addition of diluent causes a rapid temperature drop which interferes with sustained high temperature attack of the ore.

This invention, therefore, has for its principal object the dissolution of titaniferous ore in sulfuric acid. Another object is to accomplish this dissolution without formation of solid precipitates. Another object is to produce commercially acceptable titanium solutions directly from titaniferous ores by maintaining the reaction mass in fluid state. Yet another object is to produce higher yields of the titanium values in solution than have heretofore been possible in so-called fluid processes. A still further object is to accomplish the above objects by a simple process and without resort to difficultly controllable operating procedures such as the dilution technique.

Broadly, this invention consists of an improved process for dissolution of titaniferous materials by operating under such conditions that the digestion is maintained in a fluid state throughout the entire reaction and in which substantially all of the titanium values are solubilized in the resultant solution.

In order to attain these conditions of operation, two factors are essential: (1) use of the required amount of acid at a concentration of from 60% to below 75% $H_2SO_4$, preferably about 70% $H_2SO_4$, and (2) continuously maintaining a constant water content in the mixture throughout the reaction. The water content of the mixture may be continuously maintained by suitable means, such as for example, continuously, immediately, and concomitantly condensing and returning to said mixture the water vapors released therefrom by use of a reflux condenser. If no device is used to maintain a constant water content in the system, the steam produced by the heat of reaction will be liberated and lost causing the digestion mass to turn solid.

In its preferred embodiment, this invention consists of reacting titaniferous iron ores and concentrates with sulfuric acid at an acid/ore ratio slightly exceeding stoichiometric proportions under refluxing conditions to maintain the dissolutioning process in the fluid state. Preferably it consists of adding sulfuric acid of approximately 70% concentration to a ground ilmenite ore or titanium concentrate, with stirring, heating the mixture to substantially boiling temperature and refluxing the mass for a period from about 4 hours to about 6 hours to obtain a high yield of commercially useful titanium solution. Under these conditions the reaction mass will be found to remain liquid during the entire dissolution period.

The amount of acid used may be calculated from the known contents of titanium, iron and other acid consuming elements in the titaniferous raw material. It is preferred to use sufficient acid to form an "acid mixture," that is one containing a slight excess over the stoichiometric amount necessary for complete reaction. The excess should not exceed about 10% of the amount needed to react with the titanium content to form $Ti(SO_4)_2$.

The total amount of acid required produces a resultant so-called "acid solution," and represents the theoretical amount necessary to react with all of the iron and acid consuming elements present in the ore plus a slight excess over the theoretical amount required to form the compound $Ti(SO_4)_2$. The excess may be of the order of a few per cent, preferably not more than 10%, since economic and technical factors render use of higher excess undesirable.

By refluxing the mass under these conditions as the reaction proceeds, new and unexpected results are obtained which form the basis for the present invention. This can further be illustrated by presenting the following example:

*Example I*

200 grams of ilmenite ore analyzing 45 per cent $TiO_2$ and 36 per cent Fe as iron oxides were ground to 90% minus 325 mesh material. The ground ore was added to 543 grams of 70% $H_2SO_4$. This amount of acid represented sufficient to combine with all the titanium and iron present plus an excess amounting to 8.5% of that required to combine with the titanium. The mixture was agitated rapidly, heated to boiling, and maintained at boiling temperature while agitating, in a vessel equipped with a reflux condenser for 5½ hours.

As the reaction proceeded the temperature of the boiling mixture automatically decreased as the ore was attacked by the acid. A log of the boiling temperature changes was recorded as the reaction progressed and the results are presented as curve A in Figure I. The digestion mass remained in a fluid state throughout the entire reaction.

After dissolution was completed the specific gravity of the solution was adjusted by dilution with water and the solution clarified and filtered in the normal manner. The resultant solution suitable for further processing contained 96 per cent yield of the total titanium values from the ore and had a specific gravity of 1.525 at 60° C.

For purposes of comparison similar charges of ore were treated with 85% and 75% sulphuric acid respectively in separate test runs. The ratio of acid to ore was the same as in Example I. In each case the reaction mass was diluted with water during dissolution to preserve fluidity when thickening was evident. Yield of titanium in solution in each of these comparison tests was 91% compared to 96% obtained according to this invention illustrated by Example I.

The process of this invention provides a method wherein more efficient yield of titanium from titaniferous ores may be obtained. The unique combination of acid strength, acid to ore ratio and employment of means to preserve the original water content results in a fluid reaction mass at all times during the dissolution. Elimination of diluting additions results in sustained high boiling temperatures and sustained efficient reaction conditions. The concentration and amount of acid originally used is effective in preventing precipitation of various compounds which have hitherto hindered dissolution processes of this class. The process of this invention is simple and requires no elaborate controls or personal judgment during the dissolution cycle. Once the process is started no additions of water or dilute acid are necessary or desirable, the refluxing means automatically maintaining the liquid content required to prevent thickening and solidification of the reaction mass.

While a preferred embodiment of this invention has been described, it is to be understood that the invention contemplates the use of all equivalent materials, steps, and operations such as may fall within the scope of the following claims.

I claim:

1. A process for dissolving iron and titanium from titaniferous ore containing iron which comprises admixing such ore with sulfuric acid of strength between 60% and 75% sulfuric acid, agitating and heating said mixture at substantially boiling temperature, meanwhile continuously, immediately and concomitantly condensing and returning to said mixture the water vapor released therefrom, in which dissolution of the iron and titanium content of the titaniferous ore is effected.

2. Process according to claim 1 in which the amount of sulfuric acid added is sufficient to form an acid mixture.

3. Process according to claim 1 in which the amount of sulfuric acid added is sufficient to form stoichiometric amount to react with said titaniferous material plus up to about 10% excess of that required to react with the titanium content thereof.

4. Method according to claim 1 in which the mixture is heated to a boiling temperature for a period of from about 4 hours to about 6 hours.

HELMUT ESPENSCHIED.

REFERENCES CITED

The following references are of record in the file of this patent:

UNITED STATES PATENTS

| Number | Name | Date |
|---|---|---|
| 1,831,852 | Farup | Nov. 17, 1931 |
| 1,919,425 | Farup | July 25, 1933 |
| 2,167,628 | Alessandroni | Aug. 1, 1939 |
| 2,344,553 | Loth et al. | Mar. 21, 1944 |
| 2,413,641 | McAdam | Dec. 31, 1946 |